(12) United States Patent
Lin (10) Patent No.: US 8,688,888 B1
(45) Date of Patent: Apr. 1, 2014

(54) COMPUTER PERIPHERAL DEVICE AND OPERATING METHOD THEREOF

(71) Applicant: Giga-Byte Technology Co., Ltd., New Taipei (TW)

(72) Inventor: Tzu Chieh Lin, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 0 days.

(21) Appl. No.: 13/732,365

(22) Filed: Dec. 31, 2012

(51) Int. Cl.
*G06F 13/20* (2006.01)
*G06F 13/00* (2006.01)

(52) U.S. Cl.
USPC ............................ 710/313; 710/62; 713/300

(58) Field of Classification Search
CPC ........................................................ G06F 13/20
USPC ................. 710/72, 305–313, 32–63; 713/300
See application file for complete search history.

(56) References Cited

U.S. PATENT DOCUMENTS

| | | | | |
|---|---|---|---|---|
| 6,178,514 B1* | 1/2001 | Wood | | 713/300 |
| 8,234,416 B2* | 7/2012 | Lai | | 710/16 |
| 2001/0003205 A1* | 6/2001 | Gilbert | | 713/320 |
| 2007/0192519 A1* | 8/2007 | Chih et al. | | 710/62 |
| 2008/0008337 A1* | 1/2008 | Liu | | 381/120 |
| 2009/0276546 A1* | 11/2009 | Lui et al. | | 710/16 |
| 2011/0246681 A1* | 10/2011 | Lai | | 710/16 |
| 2011/0249380 A1* | 10/2011 | Lee | | 361/679.01 |
| 2012/0210143 A1* | 8/2012 | Amemura | | 713/300 |
| 2012/0290721 A1 | 11/2012 | Vinokour et al. | | |
| 2012/0290761 A1* | 11/2012 | Chen et al. | | 710/305 |
| 2013/0129283 A1* | 5/2013 | Lee | | 385/71 |

FOREIGN PATENT DOCUMENTS

| | | |
|---|---|---|
| CN | 201527619 U | 7/2010 |
| CN | 201898592 U | 7/2011 |
| JP | 2008146419 A | 6/2008 |
| JP | 2012168878 A | 9/2012 |

\* cited by examiner

*Primary Examiner* — Christopher Shin
(74) *Attorney, Agent, or Firm* — Chun-Ming Shih (57) ABSTRACT

A computer peripheral device, which is adapted to a computer system having a system-end connecting interface, includes a device-end connecting interface, an impedance unit and a control unit. The device-end connecting interface includes a power pin and a ground drain pin. The power pin electrically connects to a power source of the computer system and generates a voltage level on the ground drain pin. The impedance unit electrically connects to the power pin and ground drain pin of the device-end connecting interface respectively and decreases the voltage level of the ground drain pin optionally. The control unit electrically connects to the ground drain pin of the device-end connecting interface and determines a USB specification of the system-end connecting interface according to the voltage level of the ground drain pin.

9 Claims, 7 Drawing Sheets

COMPUTER PERIPHERAL DEVICE AND OPERATING METHOD THEREOF

BACKGROUND OF THE INVENTION

1. Field of the Invention

The present invention relates to a computer peripheral device, especially to a computer peripheral device having a connecting interface of universal serial bus.

2. Description of Related Art

For the connecting interfaces of electronic devices nowadays, universal serial bus, USB in short, has gradually become an important standard. A computer peripheral device can be connected to a computer through a USB connector as an input or output interface. USB interfaces are widely adopted in not only various information and communication products such as personal computers and portable electronic devices but also home appliances, multimedia products and game consoles, etc.

A USB connector is small in form factor and suitable for various kinds of electronic devices. Besides data transmission and reception, power can also be supplied through the USB connector, which brings about much convenience in our lives like at the time to charge batteries. Various types of USB connectors are available such as TYPE-A, TYPE-B, MICRO-USB and MINI-USB, which facilitates extension of the application.

Besides, the USB connector also has fabulous performance on data transmission speed. The maximal data transmission speed of the prior standard USB 1.1 is 12 Mbps (Mega-bit per second) and was enhanced to 480 Mbps for USB 2.0. The state-of-the-art USB 3.0 further boosts the speed to 5 Gbps (Giga-bit per second).

New USB 3.0 is designed to be backward compatible with USB 2.0 and 1.1 and to support the full-duplex mode that has much larger transmission speed than and is absent in USB 2.0 in half-duplex mode. Besides, five more pins, SSRX+, SSRX−, SSTX+, SSTX− and GND_DRAIN are used in USB 3.0 compared with USB 2.0, among which SSRX+ and SSRX− are data input pins, while SSTX+ and SSTX− are data output pins. These pins are located in parallel with the original four pins of USB 2.0, which are VBUS, GND, D+ and D−. The transmission speed of USB 3.0 can be as high as 25 Gbps in case of fiber communication.

In terms of power supply between computers and electronic devices, USB 3.0 can provide a maximal current of 900 mA (only 500 mA for USB 2.0) and adopts multi-level power management technique which can provide various power management plans for various facilities.

However, although USB 3.0 is backward compatible with some earlier USB standards such as USB 2.0 or 1.1 that are currently more common in the marketplace, the USB standard has to be determined in advance in order to provide adequate support for the peripheral device and the computer. In prior art, the determination of the USB standard is performed by a USB 3.0 host controller electrically disposed on a mainboard of the computer system. Since a peripheral device with USB 3.0 connectors is often connected to a computer system with USB 2.0 connectors, the former will not be identified by the computer or will be driven complying with USB 2.0 if a USB 3.0 host controller is missing in the computer system. As a result, the peripheral device with USB 3.0 ports cannot run in an optimized way. For example, a longer battery-charging time and a louder noise upon playing audio may happen to the peripheral device. Even worse, the peripheral device may break down under this condition.

As a result, it is impossible for a peripheral device with USB 3.0 interfaces to be adapted to a computer system with other earlier USB standard than 3.0. Lack of the backward compatibility is a serious limitation in the usage of the USB 3.0 interfaces. However, if a USB 3.0 host controller is added to the computer system with the interface of any earlier USB standard as a common solution to the aforementioned problems, the manufacturing cost will be much higher, which is undesirable in practice.

SUMMARY OF THE INVENTION

In view of this, the present invention solves the above problems by providing a computer peripheral device and a method thereof adapting the computer peripheral device with USB 3.0 interfaces to computer systems with interfaces of either USB 3.0 or earlier USB standard.

In one embodiment, a computer peripheral device, adapted to a computer system having a system-end connecting interface, comprises a device-end connecting interface, a control unit and an impedance unit. The device-end connecting interface is detachably electrically connected to the system-end connecting interface of the computer system. The device-end connecting interface comprises a power pin and a ground drain pin wherein the power pin is electrically connected to a power source of the computer system and generates a voltage level on the ground drain pin. The control unit is electrically connected to the ground drain pin and determines an adopted standard of the system-end connecting interface according to the voltage level of the ground drain pin. The impedance unit is electrically connected to the power pin and the ground drain pin respectively and decreases the voltage level of the ground drain pin optionally.

In another embodiment, a computer peripheral device, adapted to a computer system having a system-end connecting interface, comprises a device-end connecting interface, a control unit, an impedance unit and an operational amplifier. The device-end connecting interface is detachably electrically connected to the system-end connecting interface. The device-end connecting interface comprises a power pin and a ground drain pin wherein the power pin is electrically connected to a power source of the computer system and generates a voltage level on the ground drain pin. The control unit is electrically connected to the ground drain pin and determines a USB standard of the system-end connecting interface according to the voltage level of the ground drain pin. The impedance unit is electrically connected to the power pin and the ground drain pin respectively and decreases the voltage level of the ground drain pin optionally. The operational amplifier is electrically connected to the system-end connecting interface and the control unit wherein the control unit generates a gain control signal according to the voltage level and the operational amplifier adjusts a gain setting according to the gain control signal.

In still another embodiment, a method for operating a computer peripheral device comprises the following steps. Electrically connects a device-end connecting interface to a system-end connecting interface of a computer system, wherein a power pin of the device-end connecting interface is electrically connected to a power source of the computer system and generates a voltage level on a ground drain pin of the device-end connecting interface. Decreases the voltage level of the ground drain pin optionally by an impedance unit. Detects a voltage level of the ground drain pin by a control unit. And determines a USB standard of the system-end connecting interface according to the voltage level by the control unit.

The present invention is advantageous basically because the computer peripheral device is able to determine the USB standard of the connecting interfaces of the computer system connected thereto by the circuit design of the existing control unit and the device-end connecting interface of the computer peripheral device itself without arrangement of an additional USB 3.0 host controller. In particular, the impedance unit is placed between the ground drain pin and the power pin of device-end connecting interface. Furthermore, the computer peripheral device can correspondingly adjusts electrical characteristics and functions thereof according to the determined USB standard for attaining the optimal performance such as maximizing the signal power. Also, other electronic devices like loudspeakers or audio processors may be combined with the present invention to diversify the application.

These and other objectives of the present invention will no doubt become obvious to those of ordinary skill in the art after reading the following detailed description of the preferred embodiments that is illustrated in the various figures and drawings.

DETAILED DESCRIPTION OF THE PREFERRED EMBODIMENTS

The computer peripheral device with USB interfaces of the present invention includes for example smart phones, stereo sets, loudspeakers, Walkman, flash drives, A/V players and netbooks.

Figure 1:
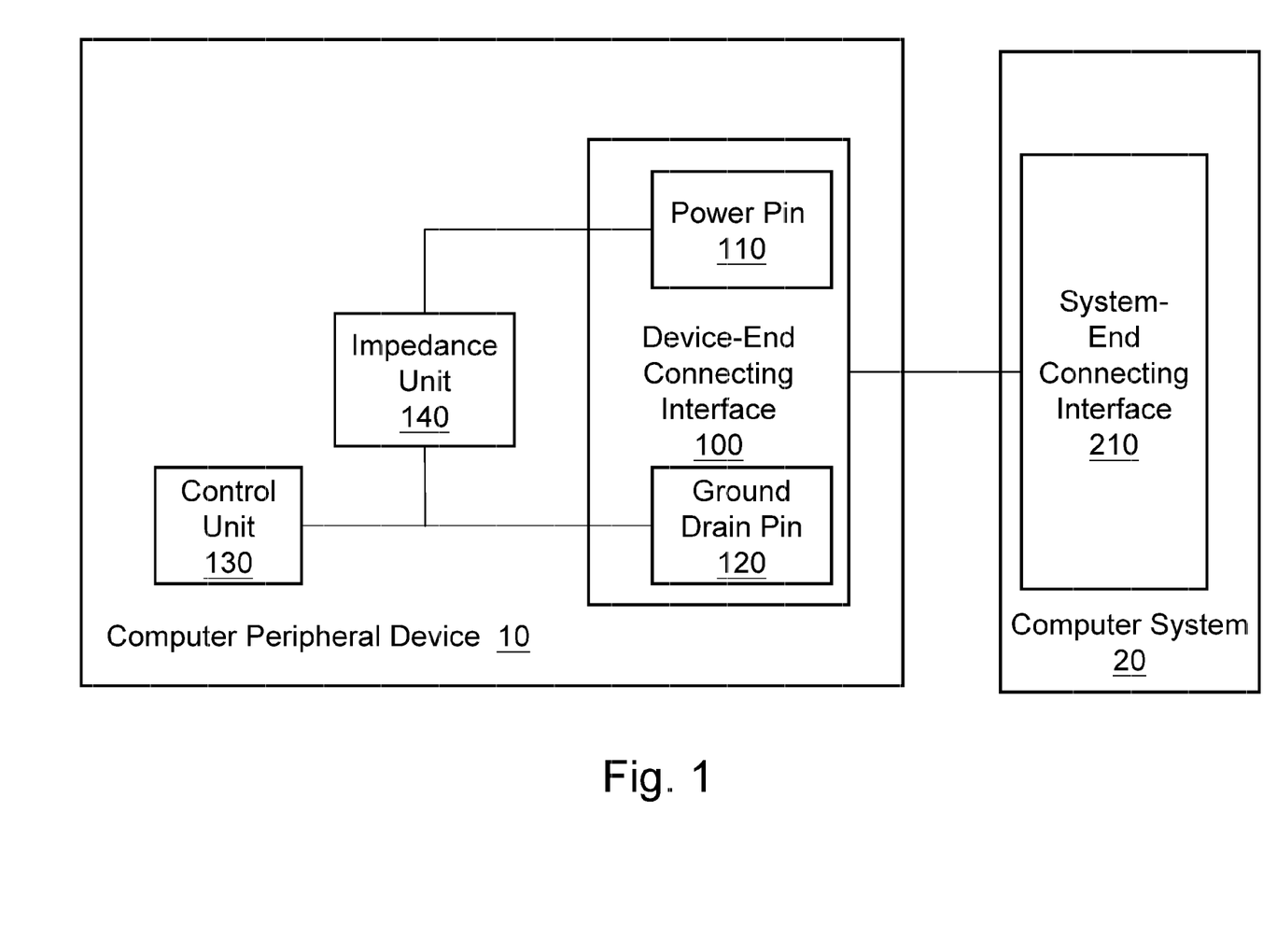
FIG. 1 is a block diagram of the computer peripheral device of the first embodiment of the present invention.

FIG. 1 is a block diagram of a computer peripheral device 10 of a first embodiment of the present invention.

In this embodiment, the computer peripheral device 10 is adapted to a computer system 20 having at least a system-end connecting interface 210 electrically disposed therein and can receive power and/or transmit electric signals through the system-end connecting interface 210 of the computer apparatus 20.

The computer peripheral device 10 includes a device-end connecting interface 100 electrically disposed on a mainboard, a control unit 130 and an impedance unit 140. The computer peripheral device 10 is detachably electrically connected to the system-end connecting interface 210 through the device-end connecting interface 100 which is a USB 3.0 interface including a power pin 110 and a ground drain pin 120. When the computer peripheral device 10 is electrically plugged in the computer system 20, the power pin 110 is electrically connected to a power source of the computer system 20 and a voltage level is thus formed on the ground source pin 120. The control unit 130 can be but not limited to a central processing unit or a micro-controller and is electrically connected to the ground drain pin 120 in order to detect dynamically the voltage level of the ground drain pin 120 and determine the standard of the system-end connecting interface 210 according to the voltage level of the ground drain pin 120. The impedance unit 140 is electrically connected to the power pin 110 and the ground drain pin 120 respectively for decreasing the voltage level of the ground drain pin 120 optionally.

It is to be noted that the device-end connecting interface 100 of the present invention is a USB 3.0 interface, the power pin 110 thereof is backward compatible with the VBUS pin of USB 2.0 and the ground drain pin 120 thereof is the GND_DRAIN pin of USB 3.0. Hence, in the computer system 20, there is no ground pin on the system-end connecting interface 210 with USB 2.0 ports corresponding to the ground drain pin 120 of USB 3.0, resulting in the floating ground drain pin 120. Nevertheless, since the power pin 110 will be connected to a USB power source of the computer system 20 through the system-end connecting interface 210 and coupled with the floating ground drain pin 120 through the impedance unit 140, a voltage level is formed on the ground drain pin 120 with respect to the computer system 20 and detected by the control unit 130 of the computer peripheral device 10. Further, the control unit 130 will determine the USB standard of the system-end connecting interface 210 (USB 2.0) according to the voltage level.

On the contrary, if the system-end connecting interface 210 is of USB 3.0, there is a corresponding ground pin on the system-end connecting interface 210 to the ground drain pin 120 of the computer peripheral device 10. Thus, the ground drain pin 120 will not be floating and a ground voltage level is also formed thereon. Similarly, the control unit 130 will then detect the voltage level and determines the USB standard of the system-end connecting interface 210 (USB 3.0).

It is to be noted that the impedance unit 140 of the present invention may be for example a passive or an active impedance device, such as a resistor or a transistor. However, other types of the impedance unit 140 may be selected as long as an electric coupling can be formed between the power pin 110 and the ground drain pin 120 and the voltage level of the ground drain pin can be down to ground when the system-end connecting interface 210 can afford USB 3.0 support.

Furthermore, in the present invention, the microcontroller existing in the computer peripheral device 10 can be directly employed as the control unit 130. In other words, an additional USB 3.0 host controller together with the complicated circuit design is not required.

The device-end connecting interface 100 of the present invention can be in the form of, but not limited to, TYPE-A or TYPE-B USB 3.0.

The present invention is advantageous because the computer peripheral device is able to determine the USB standard of the system-end connecting interfaces of the computer system typically by the existing control unit of the computer periphery device such as the microcontroller, without an additional USB 3.0 host controller thereon. However, the related circuit design of the control unit is inevitable drawing a pin to be electrically connected with the USB 3.0 ground drain pin of the device-end connecting interface. Thus, the computer peripheral device, when connected to the computer system with different USB standard ports, can function properly in an economic way.

Figure 2:
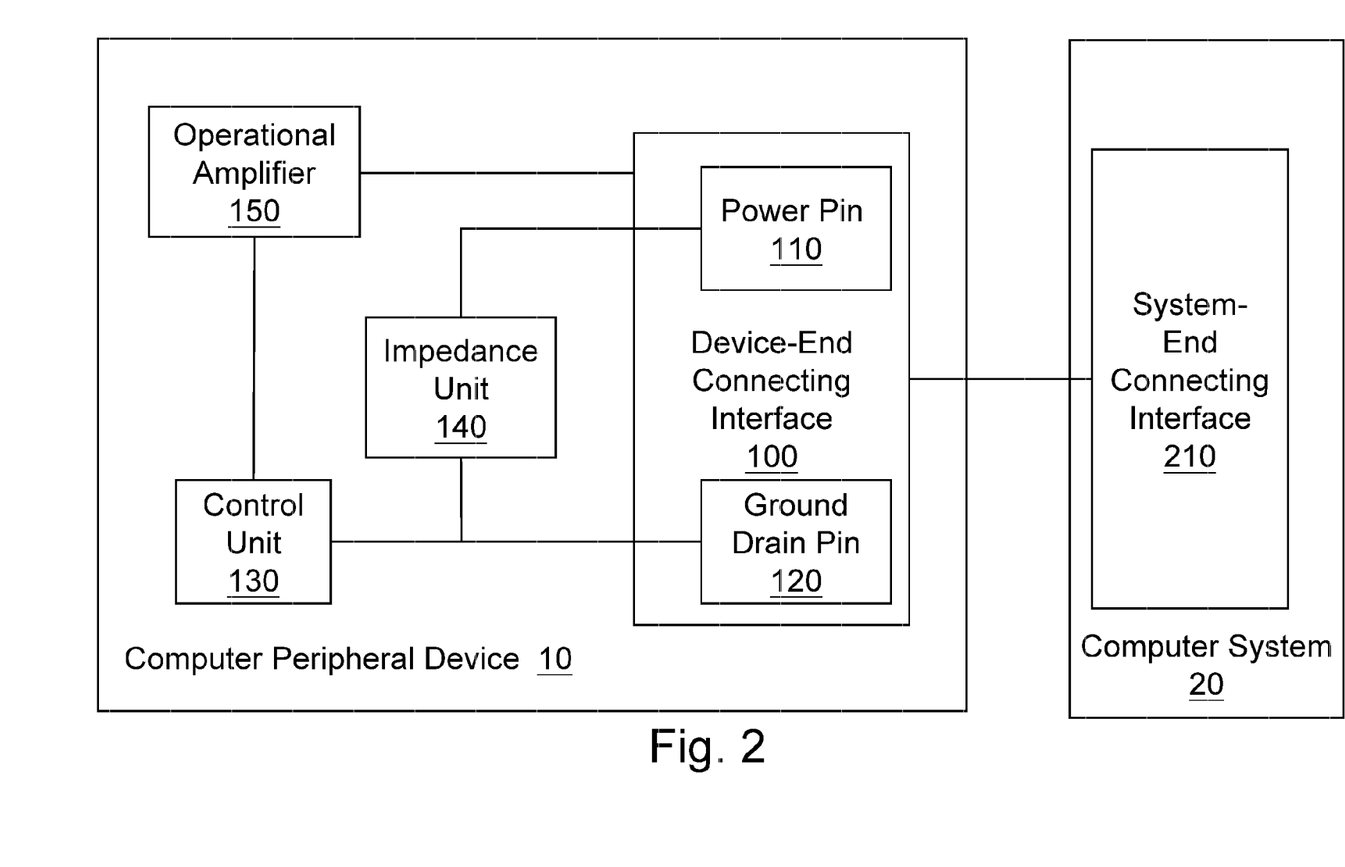
FIG. 2 is a block diagram of the computer peripheral device of the second embodiment of the present invention.

FIG. 2 is a block diagram of a computer peripheral device 30 of a second embodiment of the present invention, and FIG.

Figure 3:
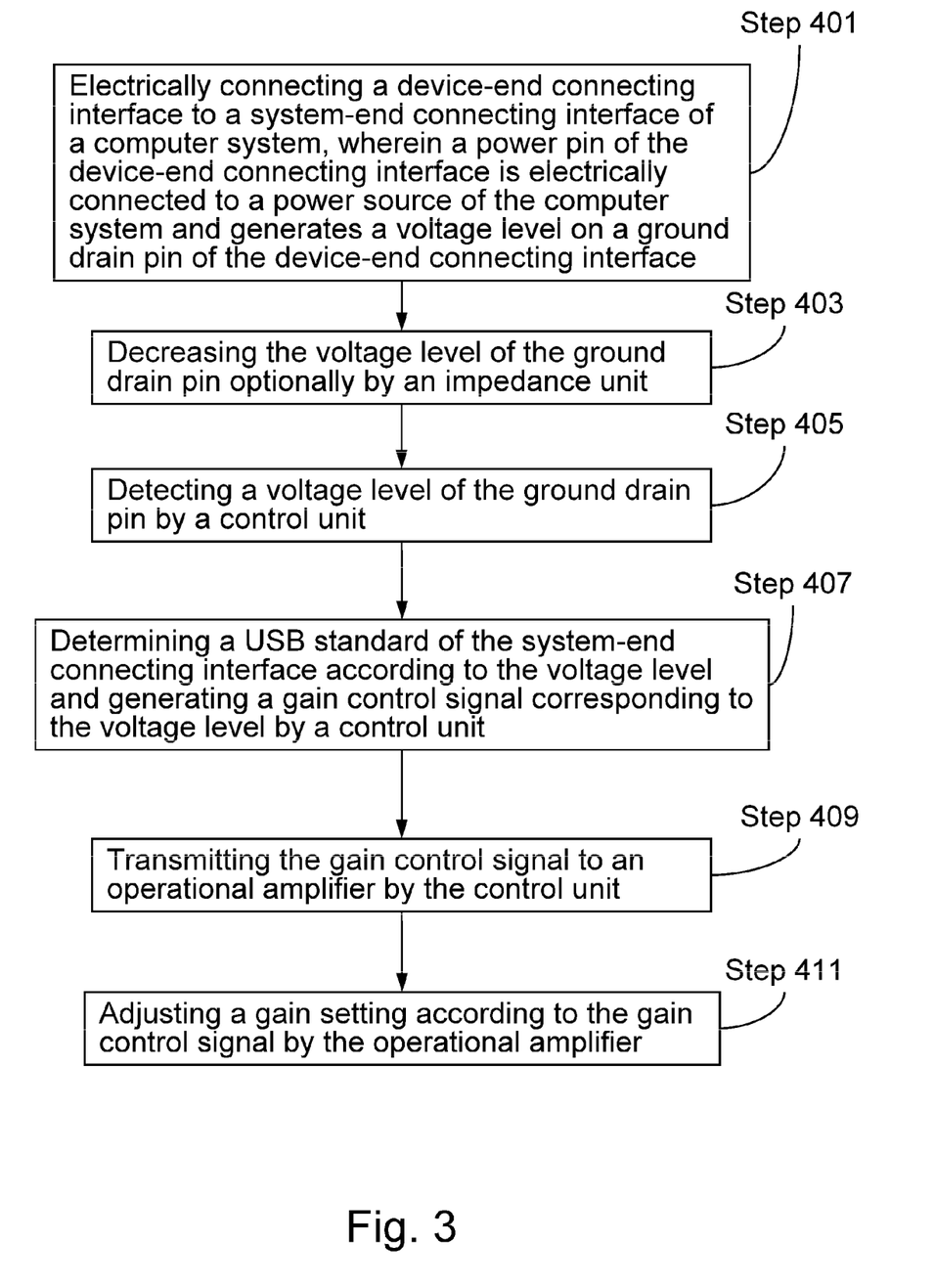
FIG. 3 is a flow chart of the method for operating the computer peripheral device of the second embodiment of the present invention.

3 is a flow chart of the method for operating the computer peripheral device 30 of the second embodiment of the present invention.

The second embodiment is basically similar to the first embodiment in configuration with only some differences that will be addressed later. In this embodiment, the computer peripheral device 30 further comprises an operational amplifier (OP-AMP) 150 electrically connected to both the device-end connecting interface 100 and the control unit 130. The computer peripheral device 30 is operated by the following steps. First, the device-end connecting interface 100 is electrically connected to a system-end connecting interface 210, and a power pin 110 of the device-end connecting interface 100 is electrically connected to a power source of the computer system 20. A voltage level is thus formed on the ground drain pin 120 of the device-end connecting interface 100 (step 401 of FIG. 3). Then, an impedance unit 140 is used to decrease the voltage level of the ground drain pin 120 optionally (step 403 of FIG. 3). If the system-end connecting interface 210 is of USB 3.0, the voltage level of the ground drain pin 120 will be decreased by the impedance unit 140. On the other hand, if the system-end connecting interface 210 is earlier USB standard, the ground drain pin 120 of the computer peripheral device 30 will be floating and the voltage level thereof will not be affected.

Afterwards, the control unit 130 detects the voltage level of the ground drain pin 120 (step 405 of FIG. 3) and determines the USB standard of the system-end connecting interface 210 according to the voltage level. Then the control unit 130 generates a gain control signal corresponding to the voltage level (step 407 of FIG. 3) and transmits the gain control signal to the operational amplifier 150 (step 409 of FIG. 3). As a last step, the operational amplifier 150 adjusts a gain setting according to the gain control signal (step 411 of FIG. 3).

Some effectual modifications can be made to the computer peripheral device 30 of the second embodiment. For example, the computer peripheral device 30 can not only determine the USB standard but also adjust the electrical characteristics and functions of the system-end connecting interface 210 for generating different or desired effects accordingly. As mentioned above, the maximum current allowed to be drawn by USB 2.0 and USB 3.0 devices is different. Thus, the computer peripheral device 30 of the embodiment can maximize the power supply by adjusting the biasing characteristics of the circuit by referring to the USB standards.

Figure 4:
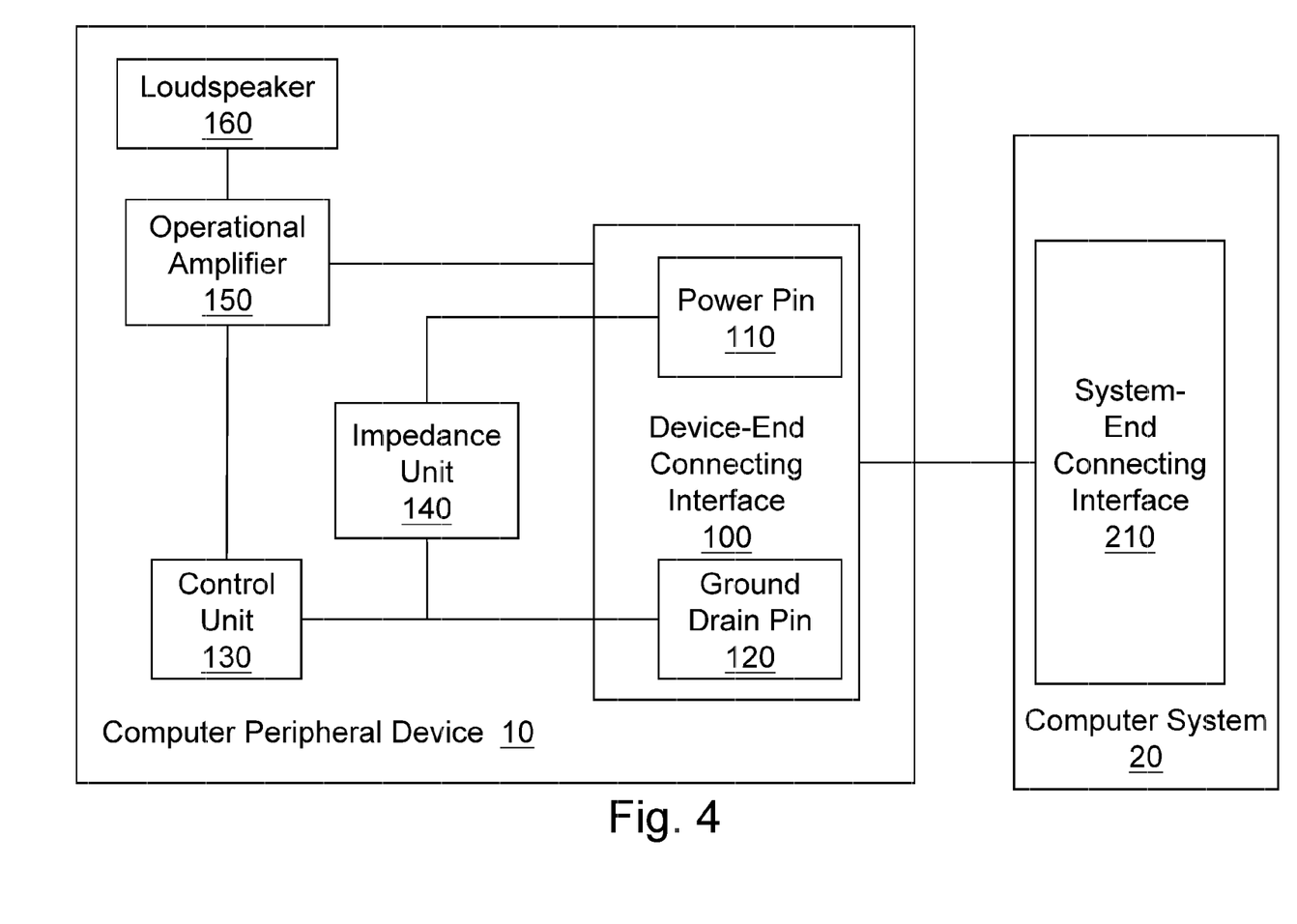
FIG. 4 is a block diagram of the computer peripheral device of the third embodiment of the present invention.
Figure 5:
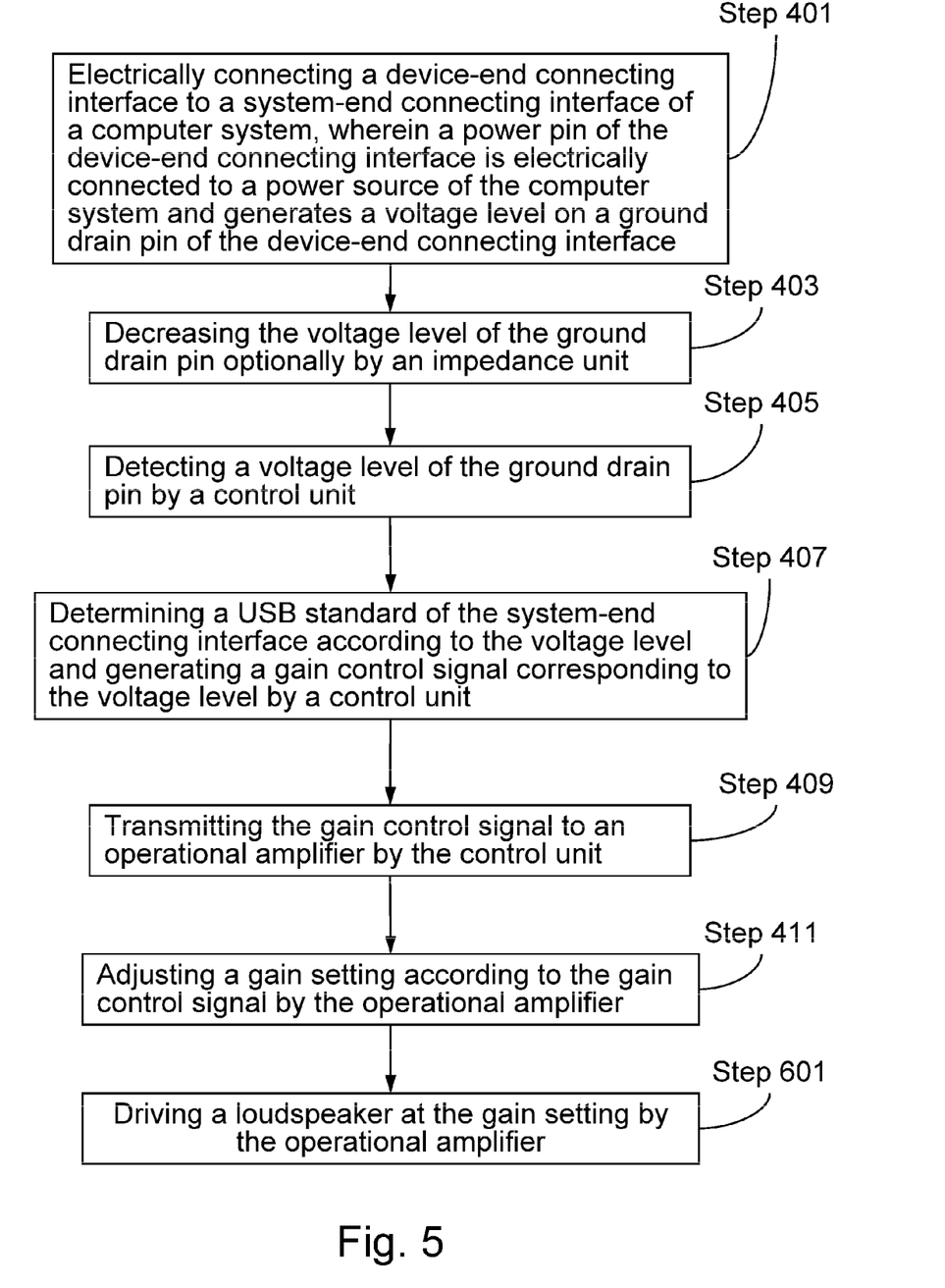
FIG. 5 is a flow chart of the method for operating the computer peripheral device of the third embodiment of the present invention.

FIG. 4 is a block diagram of a computer peripheral device 50 of a third embodiment of the present invention. FIG. 5 is a flow chart of the method for operating the computer peripheral device 50 of the third embodiment of the present invention.

The structure in the third embodiment is basically similar to that in the second embodiment with only some differences that will be addressed later. In this embodiment, the computer peripheral device 50 further comprises a loudspeaker 160 electrically connected to an operational amplifier 150. After the computer peripheral device 50 is electrically connected to a system-end connecting interface 210 through a device-end connecting interface 100, the control unit 130 determines the USB standard of the system-end connecting interface 210 and then transmits a gain control signal to the operational amplifier 150. The operational amplifier 150 adjusts the gain setting in response to the gain control signal and drives the loudspeaker 160 to output at the gain setting (step 601 of FIG. 5).

In more detail, if the control unit 130 determines the system-end connecting interface 210 is USB 3.0, the corresponding gain control signal is transmitted to the operational amplifier 150, such that the operational amplifier 150 can adjust its gain setting conforming with the USB 3.0 standard and drives the loudspeaker 160 accordingly. On the other hand, if the control unit 130 determines the system-end connecting interface 210 is USB 2.0 or 1.x earlier than USB 3.0, the corresponding gain control signal is transmitted to the operational amplifier 150, such that the operational amplifier 150 can adjust the gain setting conforming therewith and drives the loudspeaker 160 at a higher gain.

In this way, when connected to the computer system 20 with the system-end connecting interface 210 of earlier USB standard, the computer peripheral device 50 can determine the adopted standard of the system-end connecting interface 210 and adjust the gain setting of the operational amplifier 150 accordingly. Thus, the loudspeaker 160 of the computer peripheral device 50 can have performance the same as in the case electrically connected to USB 3.0. In the embodiment, the loudspeaker 160 is prevented from noise or crackle due to the insufficient voltage. The computer peripheral device 50 can therefore attain the same performance no matter whether the USB standard of the computer system 20 is 3.0 or not.

It is to be noted that in the aforementioned embodiments the operational amplifier and the loudspeaker are used as an exemplary interpretation without the intention to limit the scope of the invention. People skilled in the art may choose different types or make different designs on the operational amplifier and the loudspeaker. Various types of electronic devices can also be employed for different applications.

Figure 6:
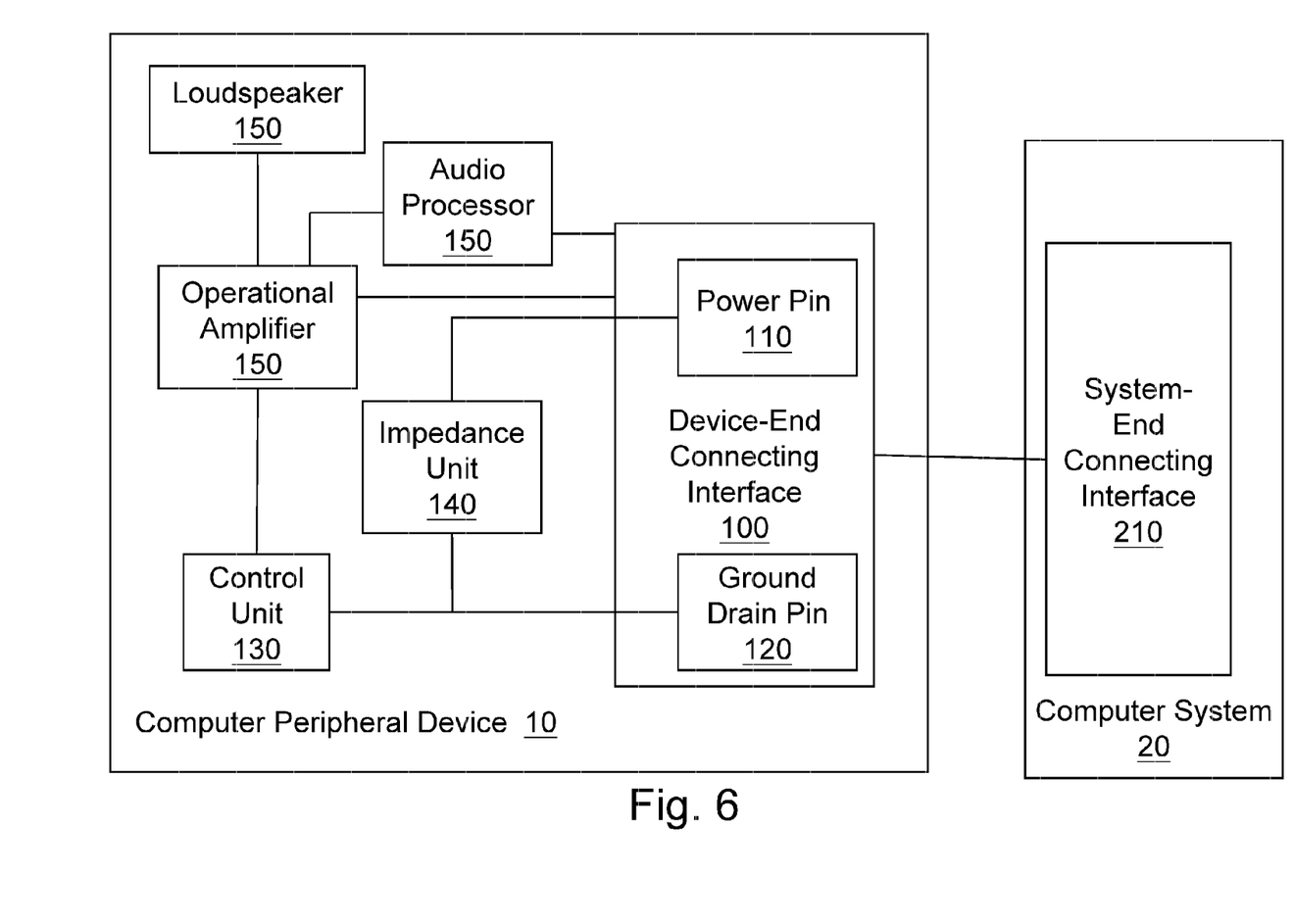
FIG. 6 is a block diagram of the computer peripheral device of the fourth embodiment of the present invention.
Figure 7:
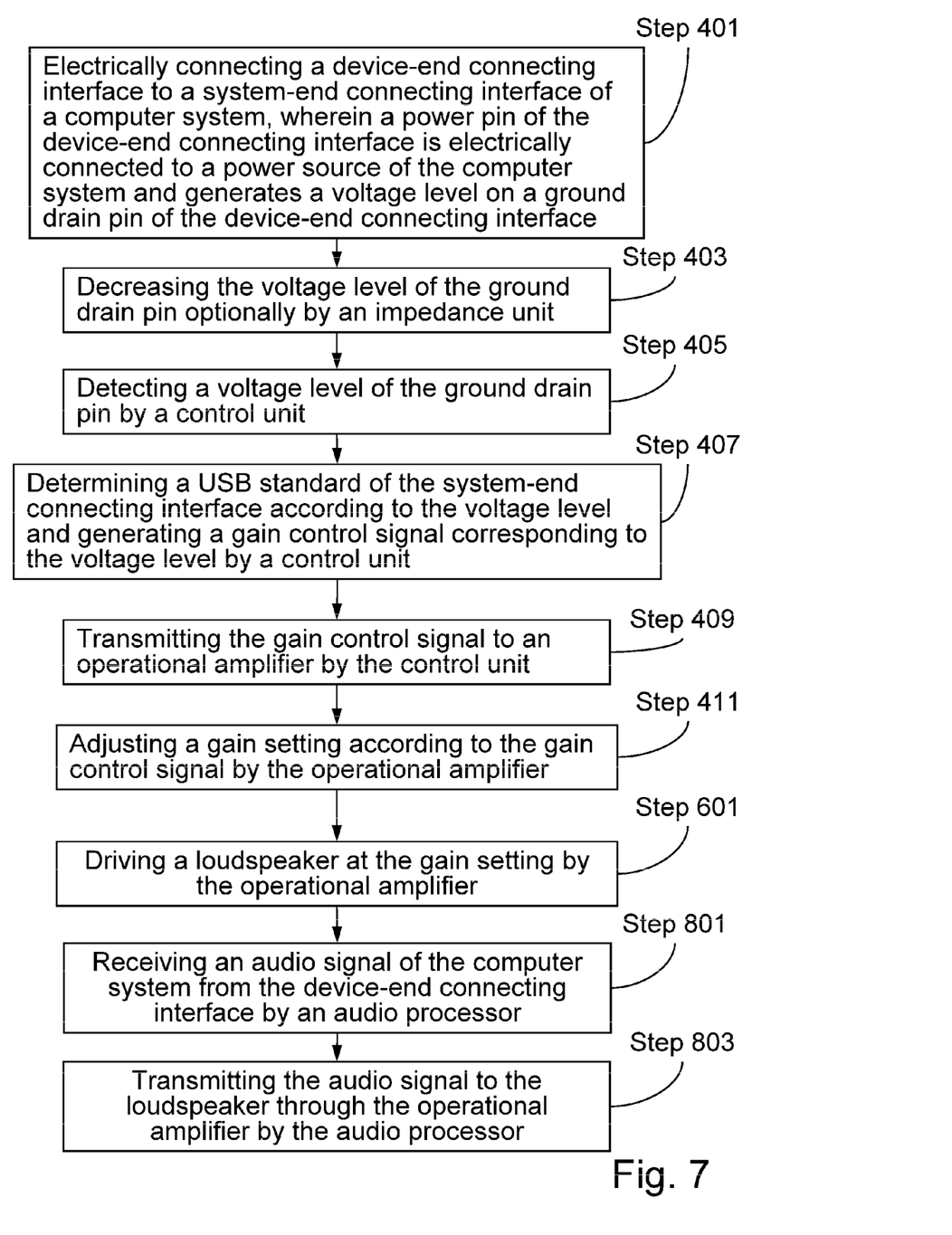
FIG. 7 is a flow chart of the method for operating the computer peripheral device of the fourth embodiment of the present invention.

FIG. 6 is a block diagram of the computer peripheral device 70 of a fourth embodiment of the present invention, and FIG. 7 is a flow chart of the method for operating the computer peripheral device 70 of the fourth embodiment of the present invention.

The structure in the fourth embodiment is basically similar to that in the third embodiment with only some differences that will be addressed later. In this embodiment, the computer peripheral device 50 further comprises an audio processor 170 electrically connected to an operational amplifier 150 and a device-end connecting interface 100. The audio processor 170 receives an audio signal from the computer system 20 through the device-end connecting interface 100 (step 801 of FIG. 7) and transmits it to the loudspeaker 160 through the operational amplifier 150 (step 803 of FIG. 7).

To sum up, the computer peripheral device of the present invention can determine the USB standard of the system-end connecting interface of the computer system, adjust properly electrical characteristics and functions according to the determined USB standard, and generate different but satisfactory effects when incorporating the circuit design of some electronic devices such as operational amplifiers and loudspeakers. For example, the computer peripheral device of the present invention can be a multi-media device which receives and processes the audio signal according to the USB standard of the system-end connecting interface.

The present invention is advantageous basically because the computer peripheral device is able to determine the USB standard of the connecting interfaces of the computer system connected thereto by the circuit design (microcontroller) of the existing control unit and the device-end connecting interface of the computer peripheral device itself without arrangement of an additional USB 3.0 host controller. In particular, the impedance unit is placed between the ground drain pin and the power pin of device-end connecting interface. Furthermore, the computer peripheral device can correspondingly adjusts electrical characteristics and functions thereof according to the determined USB standard for attaining the optimal performance such as maximizing the signal power.

Also, other electronic devices like loudspeakers or audio processors may be combined with the present invention to diversify the application.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A computer peripheral device adapted to a computer system having a system-end connecting interface, comprising:
   a device-end connecting interface detachably electrically connected to the system-end connecting interface, the device-end connecting interface comprising a power pin and a ground drain pin, wherein the power pin is electrically connected to a power source of the computer system;
   an impedance unit electrically connected to the power pin and the ground drain pin respectively, and the power pin generating a voltage level on the ground pin via the impedance unit when the power pin is electrically connected to the power source of the computer system; and
   a control unit, electrically connected to the conjunction node of the impedance unit and ground drain pin for determining a USB standard of the system-end connecting interface according to the voltage level of the ground drain pin;
   wherein the computer peripheral device is arranged such that when the ground drain pin floating, the voltage level of the ground drain pin is reduced to a ground voltage level.

2. The computer peripheral device of claim 1, wherein the control unit determines the USB standard of the system-end connecting interface is USB 2.0 or USB 3.0 according to the voltage level, and the control unit determines the USB standard of the system-end connecting interface is USB 3.0 when the impedance unit decreases the voltage level.

3. A computer peripheral device, which is adapted to a computer system having a system-end connecting interface, comprising:
   a device-end connecting interface detachably electrically connected to the system-end connecting interface, the device-end connecting interface comprising a power pin and a ground drain pin, wherein the power pin is electrically connected to a power source of the computer system and generates a voltage level on the ground drain pin;
   a control unit electrically connected to the ground drain pin and determining a USB standard of the system-end connecting interface according to the voltage level of the ground drain pin;
   an impedance unit electrically connected to the power pin and the ground drain pin respectively and decreasing the voltage level of the ground drain pin optionally; and
   an operational amplifier electrically connected to the system-end connecting interface and the control unit wherein the control unit generates a gain control signal according to the voltage level and the operational amplifier adjusts a gain setting according to the gain control signal.

4. The computer peripheral device of claim 3, further comprising a loudspeaker electrically connected to the operational amplifier, and the operational amplifier driving the loudspeaker according to the gain control signal.

5. The computer peripheral device of claim 4, further comprising an audio processor electrically connected to the operational amplifier and the device-end connecting interface, wherein the audio processor receives an audio signal of the computer system and transmits the audio signal to the loudspeaker through the operational amplifier.

6. The computer peripheral device of claim 3, wherein the control unit determines the USB standard of the system-end connecting interface is USB 2.0 or USB 3.0 according to the voltage level, and the control unit determines the USB standard of the system-end connecting interface is USB 3.0 when the impedance unit decreases the voltage level.

7. A method for operating a computer peripheral device having a device-end connecting interface, an impedance unit and a control unit, comprising:
   electrically connecting the device-end connecting interface to a system-end connecting interface of a computer system, wherein a power pin of the device-end connecting interface is electrically connected to a power source of the computer system and generates a voltage level on a ground drain pin of the device-end connecting interface;
   decreasing the voltage level of the ground drain pin optionally by the impedance unit;
   detecting a voltage level of the ground drain pin by the control unit;
   determining a USB standard of the system-end connecting interface according to the voltage level by the control unit;
   generating a gain control signal corresponding to the voltage level and transmitting the gain control signal to an operational amplifier of the computer peripheral device by the control unit; and
   adjusting a gain setting according to the gain control signal by the operational amplifier.

8. The method for operating the computer peripheral device of claim 7, further comprising:
   driving a loudspeaker of the computer peripheral device at the gain setting by the operational amplifier.

9. The method for operating the computer peripheral device of claim 8, further comprising:
   receiving an audio signal of the computer system from the device-end connecting interface by an audio processor of the computer peripheral device; and
   transmitting the audio signal to the loudspeaker through the operational amplifier by the audio processor.

* * * * *